United States Patent [19]

Sakata et al.

[11] Patent Number: 4,911,987
[45] Date of Patent: Mar. 27, 1990

[54] METAL/CERAMIC OR CERAMIC/CERAMIC BONDED STRUCTURE

[75] Inventors: Kimiko Sakata, Machida; Tadao Tokushima, Hamamatsu, both of Japan

[73] Assignee: National Research Institute for Metals, Tokyo, Japan

[21] Appl. No.: 388,096

[22] Filed: Aug. 1, 1989

Related U.S. Application Data

[63] Continuation-in-part of Ser. No. 98,423, Sep. 18, 1987, abandoned.

[30] Foreign Application Priority Data

Sep. 24, 1986 [JP] Japan ................................ 61-223710

[51] Int. Cl.$^4$ ............................................. B32B 15/04
[52] U.S. Cl. .................................... 428/469; 428/698; 428/701
[58] Field of Search ............... 428/698, 701, 469, 457, 428/689

[56] References Cited

U.S. PATENT DOCUMENTS 4,649,084  3/1987  Hale et al. ....................... 428/698 X
4,702,970  10/1987  Sarin et al. ....................... 428/701 X
4,719,151  1/1988  Chyung et al. .................. 428/701 X

OTHER PUBLICATIONS

English translation of Japanese Laid–Open Patent Application No. 60-195065, Oct. 3, 1985, Kokai (1).
English translation of Japanese Laid–Open Patent Application No. 61-197475, Sep. 1, 1986, Kokai (2).

*Primary Examiner*—Thomas J. Herbert
*Attorney, Agent, or Firm*—Pollock, Vande Sande & Priddy

[57] ABSTRACT

A bonded structure of a metal and a ceramic, in which a layer of the ceramic is coated on the surface of the metal as a substrate through an interlayer, or in which a layer of the metal is coated on the surface of the ceramic as a substrate through an interlayer, wherein said interlayer consists of (a) a composition composed of 0.2 to 4 mole % of yttria and a balanced mole % of the main component of the metal to bonded in which a powder of said metal and a powder of yttria are intimately mixed and then given a mechanical impact whereby the two powders are bonded to each other to form a nearly spherical composite powder or (b) a composite composed of 0.2 to 4 mole % of yttria, up to 2 mole % of the main component of the ceramic to be bonded and a balanced mole % of the main component of the metal to be bonded, in which a powder of said metal, a powder of yttria and a powder of said ceramic are intimately mixed and then given a mechanical impact, whereby these powders are bonded to one another to form a nearly spherical composite powder, said interlayer is formed by plasma-spraying the components of said composition onto the ceramic or metal to be bonded, or by coating the components of said composition on the ceramic or metal to be bonded and then heat-treating the resulting structure at a high temperature in vacuum or in an inert gas.

3 Claims, 14 Drawing Sheets

Al alloy | Al-Y$_2$O$_3$-ZrO$_2$ | PSZ | 0.1mm

Al alloy      Al-Y$_2$O$_3$-ZrO$_2$

10 μm

Al-Y₂O₃-ZrO₂        PSZ

10 μm

Al alloy    Al-$Y_2O_3$    $Al_2O_3$-MgO
           -$Al_2O_3$ 0.1 mm $Al_2O_3$    Fe-FeO    SUS 0.1 mm 10μm Al₂O₃    Al-ZrO₂    PSZ      0.2mm Al₂O₃   TiN   0.1mm

WC

10μm

Al₂O₃  SiC  0.1 mm

Si₃N₄  10μm

METAL/CERAMIC OR CERAMIC/CERAMIC BONDED STRUCTURE

This application is a continuation-in-part application of Ser. No. 07/098,423 filed on Sept. 18, 1987, now abandoned.

This invention relates to a bonded structure of a metal and a ceramic. The bonded structure in accordance with this invention includes a structure obtained by coating a ceramic on the surface of a metal substrate, and a structure obtained by coating a metal on the surface of a ceramic substrate. Preferably, the coating is carried out by plasma-spraying.

Attempts have been made in various fields to produce functionally excellent materials by coating metallic materials with ceramics and thereby adding various properties such as heat resistance, abrasion resistance and corrosion resistance to the inherent properties of the metallic materials. There have also been many attempts to impart various functions such as insulating property and electric conductivity to the inherent properties of ceramics by coating ceramic substrates with metals or ceramics.

These coated materials, however, have the serious defect that since the adhesion strength between the substrates and the coating materials is low, external stresses are not fully transmitted to the substrate but are exerted on the coating materials themselves, and the coating materials will be broken or peeled. Accordingly, the desired properties cannot be imparted sufficiently to the substrate materials.

Various measures have been taken in the past to improve the adhesion between the substrate and the coating material. For example, they include a method in which the surface of the substrate is roughened by blasting and then the coating material is applied to the roughened surface by plasma-spraying, and a method in which the surface of the substrate is treated by a PVD or CVD method, and then the coating material is applied to the treated surface by plasma-spraying. A method has also been proposed in which plasma-spraying is carried out while continuously changing the mixing ratio of two or more powdery plasma-spraying materials. This is based on the view that relaxation of strains due to thermal expansion between a metal and a ceramic, for example, leads to elimination of the peeling phenomenon. However, by forming the roughened surface on the substrate, the coated layer is merely mechanically engaged with the substrate, and this cannot be expected to bring about a significant increase in adhesion. The pre-treatment of the substrate, however, cannot substantially offer a solution to the problem of adhesion because with a certain combination of the substrate and the coating material, there is a large difference in the coefficient of thermal expansion between the two, and thermal stresses occur in the interface between the substrate and the coating material or a brittle intermetallic compound forms. For the above reason, such coated structures normally have an adhesion strength of about 3 to 4 kg/mm$^3$.

In the field of semiconductors, thin films having a thickness of not more than 1 micrometer have been prepared for microelectronic materials by coating a metal on a ceramic substrate by CVD, vacuum deposition or sputtering thereby to impart electric conductivity or form a laminated film. Firm coatings having a thickness of more than 1 micrometer have not been obtained, and the adhesion of such coatings is still unsatisfactory as stated above.

It is an object of this invention to overcome the disadvantages of the prior art mentioned above, and to provide a bonded structure of a ceramic and a metal which particularly have excellent adhesion while permitting selection of a wide range of materials to be bonded.

According to this invention, there is provided a bonded structure of a metal and a ceramic bonded through an interlayer, wherein
said interlayer consists of
(a) a composition composed of 0.2 to 4 mole % of yttria and a balanced mole % of the main component of the metal to be bonded in which a powder of said metal and a powder of yttria are intimately mixed and then given a mechanical impact whereby the two powders are bonded to each other to form a nearly spherical composite powder or
(b) a composite composed of 0.2 to 4 mole % of yttria, up to 2 mole % of the main component of the ceramic to be bonded and a balanced mole % of the main component of the metal to be bonded, in which a powder of said metal, a powder of yttria and a powder of said ceramic are intimately mixed and then given a mechanical impact, whereby these powders are bonded to one another to form a nearly spherical composite powder, said interlayer is formed by plasma-spraying the components of said composition onto the ceramic or metal to be bonded, or by coating the components of said composition on the ceramic or metal to be bonded and then heat-treating the resulting structure at a high temperature in vacuum or in an inert gas.

The invention also provides a bonded structure of a metal and a ceramic in which a layer of the ceramic is coated on the surface of the metal as a substrate through an interlayer, wherein said interlayer is formed by plasma-spraying
(a) a composition composed of 0.2 to 4 mole % of yttria and a balanced mole % of the main component of the substrate metal, in which a powder of aid substrate metal and a powder of yttria are intimately mixed and then given a mechanical impact whereby the two powders are bonded to each other to form a nearly spherical composite powder, or
(b) a composition composed of 0.2 to 4 mole % of yttria, up to 2 mole % of the main component of the ceramic and a balanced mole % of the main component of the substrate metal, in which a powder of said metal, a powder of yttria and a powder of said ceramic are intimately mixed and given a mechanical impact whereby these powders are bonded to one another to form a nearly spherical composite powder, on the surface of the substrate metal, or by coating each said composition on the surface of the substrate metal and then heat-treating the resulting structure at a high temperature in vacuum or in an inert gas.

According to this invention, there is further provided a bonded structure of a ceramic and a metal in which a layer of the metal is coated on the surface of the ceramic as a substrate through an interlayer, wherein said interlayer is formed by plasma-spraying
(a) a composition composed of 0.2 to 4 mole % of yttria and a balanced mole % of the main component of the metal to be coated, in which the metal powder and the yttria powder are intimately mixed and then given a mechanical impact whereby the two powders are bonded to each other to form a nearly spherical composite powder, or (b) a composition composed of 0.2 to 4 mole % of yttria, up to 2 mole % of the main component of the ceramic and a balanced mole % of the main component of the metal to be coated, in which the metal powder, the yttria powder and the ceramic powder are intimately mixed and then given a mechanical impact whereby these powders are bonded to one another to form a nearly spherical composite powder,
on the surface of the substrate ceramic, or by coating each said composition on the surface of the substrate ceramic and then heat-treating the resulting structure at a high temperature in vacuum or in an inert gas.

Metals suitable for use in this invention include, for example, ferrous materials such as carbon steel, alloy steel and stainless steel, non-ferrous metals, aluminum alloys, copper alloys, noble metals, and thermally stable metallic materials such as Ti, Nb, Mo and W.

Ceramics suitable for use in this invention include, for example, oxide ceramics comprising $Al_2O_3$, $ZrO_2$, PSZ, $SiO_2$, $TiO_2$, $Nb_2O_5$ and MgO as main components, carbide ceramics comprising TiC, NbC, WC and SiC as main components, and nitride ceramics comprising AlN, TiN, NbN and $Si_3N_4$ as main components. The ceramics to be bonded may contain a suitable binder such as $Y_2O_3$ and MgO.

According to this invention, the individual components of the composition constituting the interlayer are intimately mixed and them given a mechanical impact. As a result, these components are bonded to form a nearly spherical composite powder.

By simply mixing powders of metals and ceramics in the composition constituting the interlayer, powder feeding is difficult because of the differences in specific gravitiy and particle size among the individual components, and the powdrs are liable to separate. Furthermore, since the flowability of a powder depends upon its shape, it is difficult to maintain a multiplicity of powders under the same conditions. By mixing the powders and applying a mechanical impact to the mixed powder to form a composite spherical powder, the flowability of the powder is improved and its controlled trnasportation becomes possible. Consequently, a metal/ceramic bonded structure having excellent tensile strength and thermal shock resistance can be obtained, and the amount of $Y_2O_3$ used in the interlayer can be saved.

One method of applying a mechanical impact comprises rotating within a housing a rotating disc having a plurality of impact pins (blades) provided radially in its circumference and feeding the mixed powder onto the rotating disc. The mixed powder repeatedly collides against the impact pins and the inside wall of the housing and during this time, compositization and spherodization of the mixed powder are effected. The means of applying a mechanical impact, however, is not limited to it. There are, for example, the following two methods for the production of a composite spherical powder of a metal and yttria by using this mechanical impact applying technique.

(1) An irregularly-shaped metal powder is intimately mixed with yttria powder to form a mixed powder in which yttria adheres to the surface of the metal powder. Then, a mechnical impact is given to the mixed powder whereby the mixed powder is made spherical and simultaneously yttria is bonded and fixed to the surface or interia of the metal powder to give a composite of both. The schematic view showing this method is shown in FIG. 10a.

(2) An irregularly-shaped metal powder is made spherical by using a mechanical impact applying method, for example and then mixed intimately with yttria to form a mixed powder in which yttria adheres to the surface of the metal powder. Then, a mechanical impact is imparted to the mixed powder. As a result, yttria is bonded and fixed to the surface of the metal to form a composite of both. A schematic view showing this method is given in FIG. 10b.

A composite powder of a metal, yttria and a ceramic can be produced by the same method as (1) and (2) above except that the metal, yttria and the ceramic are used instead of the metal and yttria.

In the interface between the interlayer and the metal in the bonded structures of this invention, bonding by interdiffusion of the same kind of metals, bonding by the formation of a compound between dissimilar metals, or bonding by the anchoring effect takes place. In the interface between the interlayer and the ceramic, bonding by the formation of a chemically reacted layer take place.

The "anchoring effect", as used herein, means that a roughened surface is formed on the surface of a substrate by sand blasting to improve the adhesion of the interlayer to be plasma-sprayed onto it. In the case of a metal/interlayer/ceramic structure, the metal is blasted.

Preferably, the interlayer is formed by plasma-spraying the composition onto a substrate of the metal or ceramic. There is no particular restriction on the plasma-spraying conditions, and plasma-spraying may be carried out by using conventional equipment and conventional methods. Preferably, the plasma-spraying is carried out through an inert gas such as argon, helium or a mixture thereof.

The interlayer may also be formed by coating the composition on the surface of a substrate of the metal or ceramic and then heat-treating the resulting structure at a high temperature in vacuum or in an inert gas.

Table 1 shows combinations of materials to be bonded and interlayers in the bonded structures of this invention and the reactions that take place in the interfaces between the interlayers and the metals or the ceramic.

TABLE 1

| Metal | Interface | Composite interlayer | Interface | Ceramic |
|---|---|---|---|---|
| Ferrous materials | Interdiffusion of metals of the same kind, and the anchoring effect | Main component of the metal (balance) + | Formation of a reaction layer and the anchoring effect | Oxides $Al_2O_3$, $ZrO_2$, $SiO_2$, $TiO_2$, $Nb_2O_5$ and MgO type compound oxides |
| Non-ferrous materials | | | | |
| | | Yttria (0.2–4 mole %) + | | |
| Al alloys | | | | |

TABLE 1-continued

| Metal | Interface | Composite interlayer | Interface | Ceramic |
|---|---|---|---|---|
| Cu alloys | | | | Carbides |
| Noble metals | | main component of the ceramic (0–2 mole %) | | TiC, NbC and WC typed |
| Heat-resistant metallic materials | | | | Nitrides AlN, TiN, and NbN types |

The following examples illustrate the present invention in greater detail.

EXAMPLE 1

Figure 1:
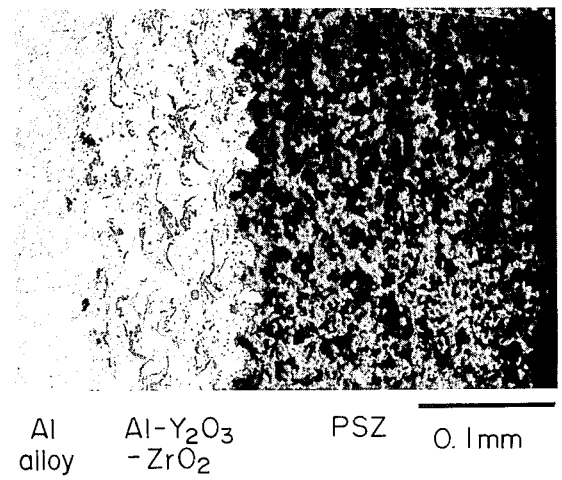
FIG. 1 is an optical micrograph of the cross section of a sample (Example 1) obtained by plasma-spraying an interlayer of a composition composed of Al, $Y_2O_3$ and $ZrO_2$ on an Al alloy and further plasma-spraying partially stabilized zirconia (PSZ)
Figure 1A:
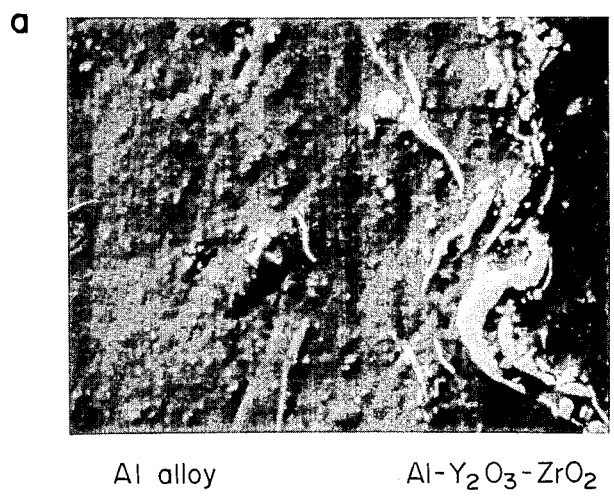
FIG. 1a is an SEM pattern of the Al alloy/interlayer interface of the sample of Example 1.
Figure 1B:
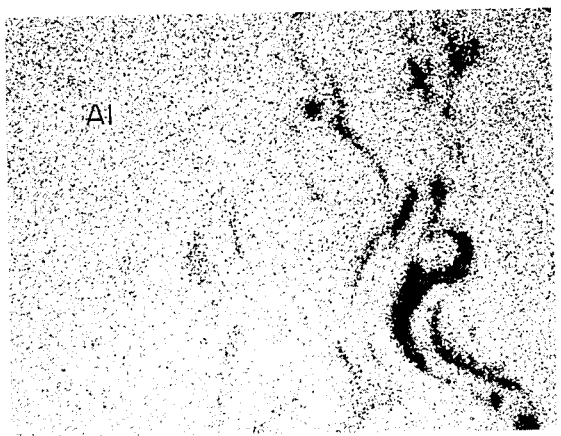
FIGS. 1b, 1c and 1d are X-ray image micrographs of Al, Y and O in the sample of Example 1, respectively.
Figure 1C:
Figure 1D:
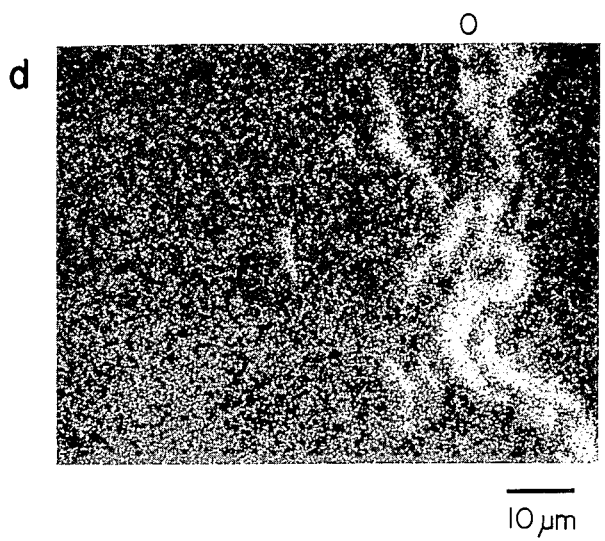
Figure 1E:
FIG. 1e is an SEM pattern of the interlayer/PSZ interface of the sample of Example 1.
Figure 1F:
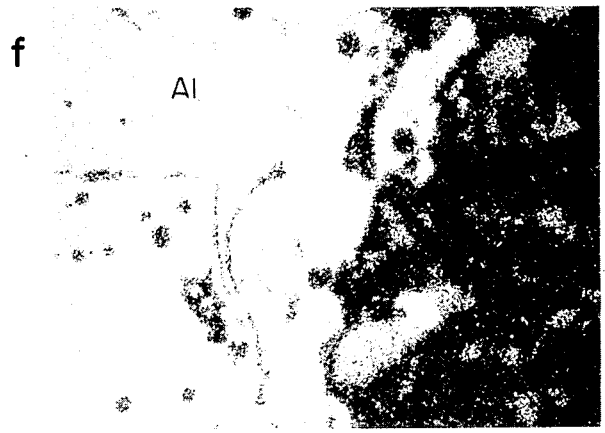
FIGS. 1f, 1g, 1h and 1i are X-ray image micrographs of Al, Y, Zr and O in the sample of Example 1, respectively.
Figure 1G:
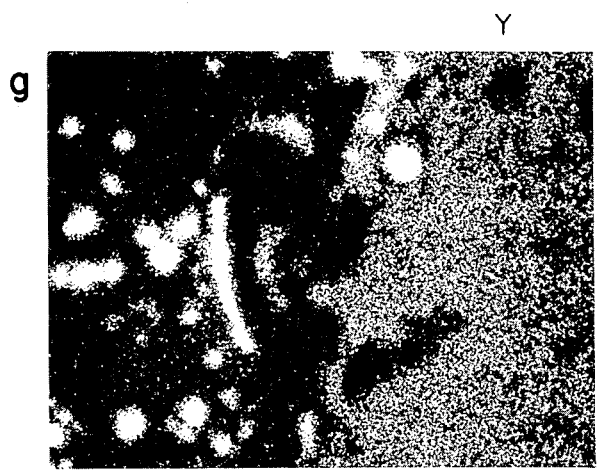
Figure 1H:
Figure 1I:
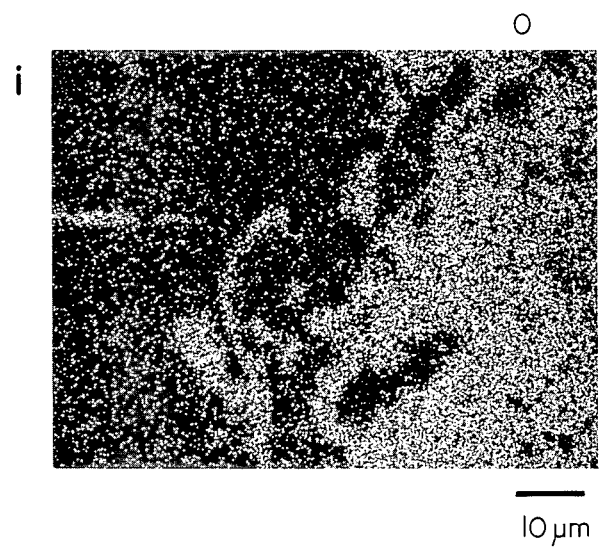

As an interlayer, a composition composed of 10 mole % of $Y_2O_3$, 2 mole % of $ZrO_2$ and the remainder being Al was plasma-sprayed on an Al alloy for 3 minutes [Ar gas 100 scFH (standard cubic feet/hour), He gas 20 scFH, 50 V, 650 A, spray distance 100 mm], and further partially stabilized zirconia (PSZ; composed of 8 mole % of $Y_2O_3$ and the remainder being $ZrO_2$ was plasma-sprayed for 5 minutes (Ar gas 100 scFH, He gas 20 scFH, 50 V, 750 A, spray distance 100 mm). (See FIG. 1.)

EXAMPLE 2

Figure 2:
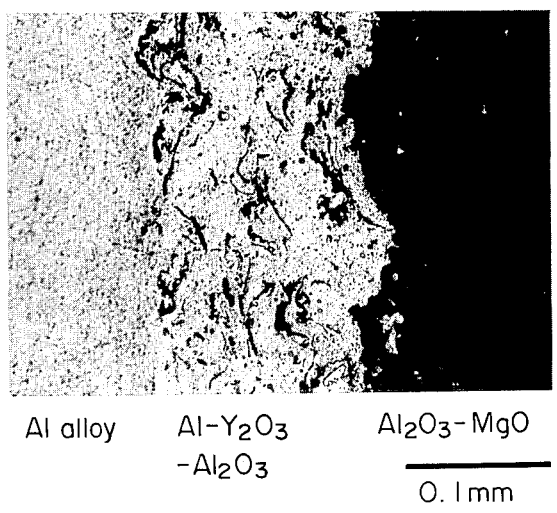
FIG. 2 is an optical micrograph of a sample (Example 2) obtained by plasma-spraying an interlayer of a composition composed of Al, $Y_2O_3$ and $Al_2O_3$ on an Al alloy and then plasma-spraying an alumina-type ceramic ($Al_2O_3$-MgO)

As an interlayer, a composition composed of 10 mole % of $Y_2O_3$, 2 mole % of $Al_2O_3$ and the remainder being Al was plasma-sprayed on an Al alloy for 3 minutes (Ar gas 100 scFH, He gas 20 scFH, 50 V, 650 A, spray distance 100 mm), and further an alumina-type ceramic composed of 5 mole % of MgO and the remainder being $Al_2O_3$ was plasma-sprayed for 5 minutes (Ar gas 100 scFH, He gas 20 scFH, 50 V, 750 A, spray distance 100 mm). (See FIG. 2.)

EXAMPLE 3

Figure 3:
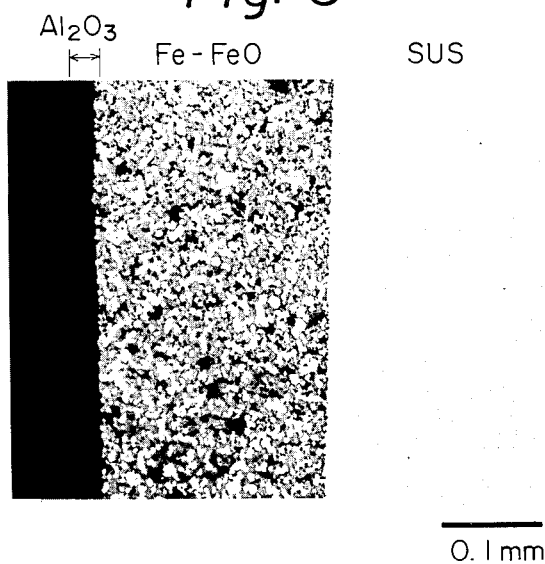
FIG. 3 is an optical micrograph of the cross section of a sample (Example 3) obtained by coating an interlayer of Fe-FeO on stainless steel, heat-treating the coated structure and then plasma-spraying alumina.

As an interlayer, a composition composed of 50 mole % of FeO and the remainder being iron was coated on stainless steel, and heat-treated for 1 hour at 1100° C. in a vacuum of $10^{-3}$ Pa. After cooling, $Al_2O_3$ was plasma-sprayed onto the coating for 5 minutes (Ar gas 100 scFH, He gas 20 scFH, 50 V, 750 A, spray distance 100 mm). (See FIG. 3.)

EXAMPLE 4

As an interlayer, a composition composed of 50 mole % of FeO and the remainder being iron was plasma-sprayed on a Ti-Fe alloy for 3 minutes (Ar gas 100 scFH, He gas 20 scFH, 50 V, 700 A, spray distance 100 mm), and further MgO was plasma-sprayed for 5 minutes (Ar gas 100 scFH, He gas 20 scFH, 50 V, 750 A, spray distance 100 mm).

EXAMPLE 5

As an interlayer, a composition composed of 5 mole % of $Y_2O_3$ and the remainder being active metal Ti was plasma-sprayed on carbon steel for 3 minutes (Ar gas 100 scFH, He gas 20 scFH, 50 V, 650 A, spray distance 100 mm), and further an SiC-type ceramic composed of 5 mole % of $Y_2O_3$ and the remainder being SiC was plasma-sprayed for 5 minutes (Ar gas 100 scFH, He gas 20 scFH, 50 V, 750 A, spray distance 100 mm).

EXAMPLE 6

As an interlayer, a composition composed of 10 mole % of $Y_2O_3$ and the remainder being active metal Ti was plasma-sprayed on carbon steel for 3 minutes (Ar gas 100 scFH, He gas 20 scFH, 50 V, 650 A, spray distance 100 mm), and further $Si_3N_4$ was plasma-sprayed for 5 minutes (Ar gas 100 scFH, He gas 20 scFH, 50 V, 750 A, spray distance 100 mm).

EXAMPLE 7

Figure 4:
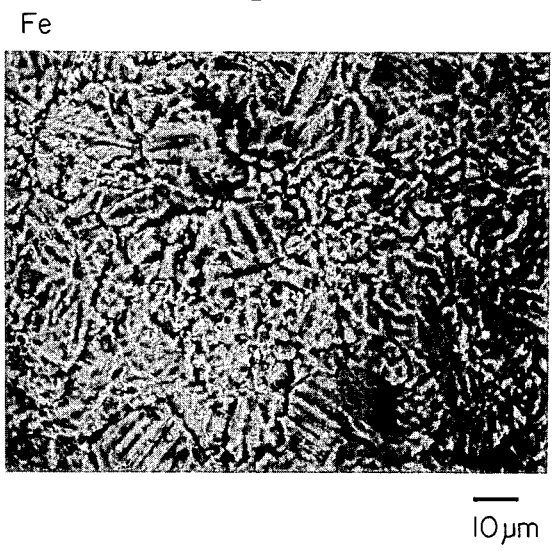
FIG. 4 is an SEM pattern of the surface of a sample (Example 7) obtained by plasma-spraying an Fe-FeO powder as an interlayer on a substrate of a zirconia-type ceramic and further plasma-spraying a powder of carbon steel (Fe)

As an interlayer, a composition composed of 25 mole % of FeO and the remainder being Fe was plasma-sprayed on a substrate of a zirconia-type ceramic for 3 minutes (Ar gas 100 scFH, He gas 20 scFH, 50 V, 700 A, spray distance 100 mm), and then carbon steel (Fe) was further plasma-sprayed for 3 minutes (Ar gas 100 scFH, He gas 20 scFH, 50 V, 700 A, spray distance 100 mm). (See FIG. 4).

EXAMPLE 8

As an interlayer, a composition composed of 5 mole % of $Y_2O_3$ and the remainder being Ti was plasma-sprayed on a substrate of an alumina-type ceramic for 3 minutes (Ar gas 100 scFH, He gas 20 scFH, 50 V, 700 A, spray distance 100 mm), and then Ti-Al alloy was further plasma-sprayed for 3 minutes (Ar gas 100 scFH, He gas 20 scFH, 50 V, 700 A, spray distance 100 mm).

EXAMPLE 9

As an interlayer, a composition composed of 5 mole % of $Y_2O_3$ and the remainder being Cu was plasma-sprayed on a substrate of an alumina-type ceramic for 3 minutes (Ar gas 100 scFH, He gas 20 scFH, 50 V, 700 A, spray distance 100 mm), and then Cu was further plasma-sprayed for 3 minutes (Ar gas 100 scFH, He gas 20 scFH, 50 V, 700 A, spray distance 100 mm).

EXAMPLE 10

As an interlayer, a composition composed of 5 mole % of $Y_2O_3$ and the remainder being Al was plasma-sprayed on a substrate of a titania-type ceramic for 3 minutes (Ar gas 100 scFH, He gas 20 scFH, 50 V, 650 A, spray distance 100 mm), and then an Al-Mg-Si alloy powder was further plasma-sprayed for 3 minutes (Ar gas 100 scFH, He gas 20 scFH, 50 V, 650 A, spray distance 110 mm).

EXAMPLE 11

Figure 5:
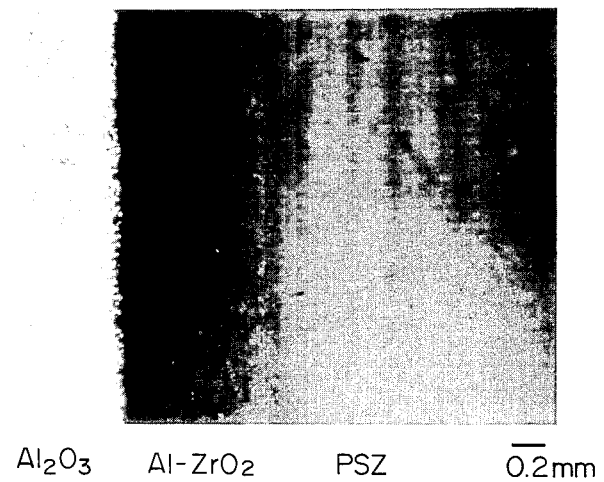
FIG. 5 is an SEM pattern of the surface of a sample (Example 11) obtained by plasma-spraying an Al-$ZrO_2$ powder as an interlayer on a substrate of an alumina-type ceramic and further plasma-spraying partially stabilized zirconia (PSZ) in the neighborhood of the alumina substrate/ interlayer/PSZ interface.

As an interlayer, a composition composed of Al and $ZrO_2$ was plasma-sprayed on a substrate of alumina, and then PSZ was further plasma-sprayed for 3 minutes (Ar gas 100 scFH, He gas 20 scFH, 50 V, 700 A, spray distance 100 mm). (See FIG. 5.)

EXAMPLE 12

Under the plasma-spraying conditions described in Example 8, a composition composed of Ti and $ZrO_2$ was plasma-sprayed onto a substrate of PSZ and further TiC was plasma-sprayed.

EXAMPLE 13

Figure 6:
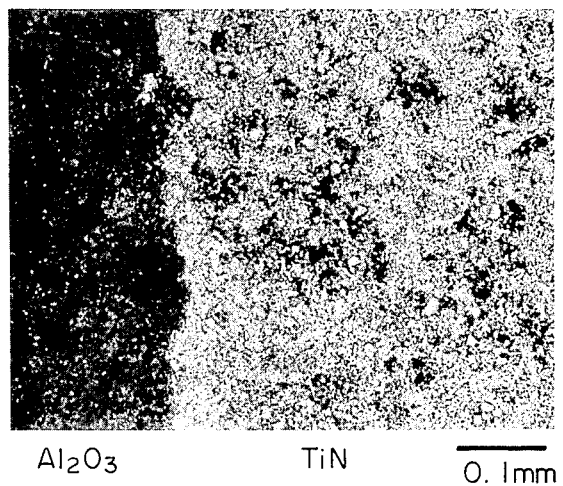
FIG. 6 is an SEM pattern of the surface of a sample (Example 13) obtained by plasma-spraying $Al_2O_3$-$Y_2O_3$ as an interlayer on a substrate of an alumina-type ceramic and further plasma-spraying TiN powder in the neighborhood of the alumina substrate/TiN interface.

Under the plasma-spraying conditions described in Example 8, a composition composed of 5 mole % of $Y_2O_3$ and the remainer being $Al_2O_3$ was plasma-sprayed onto a substrate of an alumina-type ceramic and further TiN was plasma-sprayed. (See FIG. 6.)

EXAMPLE 14

Figure 7:
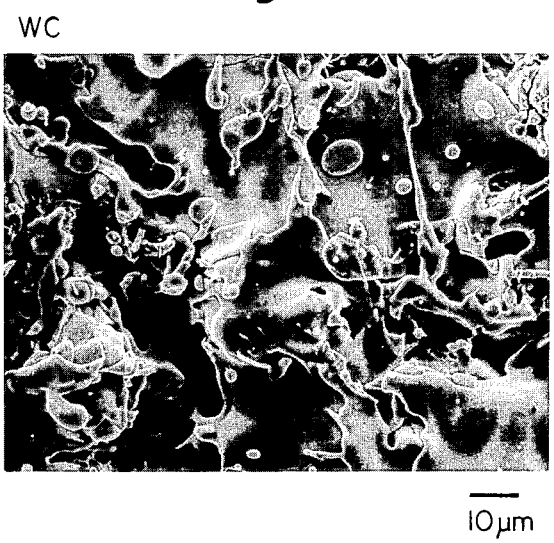
FIG. 7 is an SEM pattern of the surface of a sample (Example 14) obtained by plasma-spraying Ti-$Y_2O_3$ powder as an interlayer on a substrate of a titania-type ceramic and further plasma-spraying WC powder.

A composition composed of 10 mole % of $Y_2O_3$ and the remainder being Ti was plasma-sprayed on a substrate of a titania-type ceramic under the plasma-spraying conditions described in Example 8, and then WC was plasma-sprayed (Ar gas 100 scFH, He gas 20 scFH, 50 V, 750 A, spray distance 90 mm). (See FIG. 7.)

EXAMPLE 15

Figure 8:
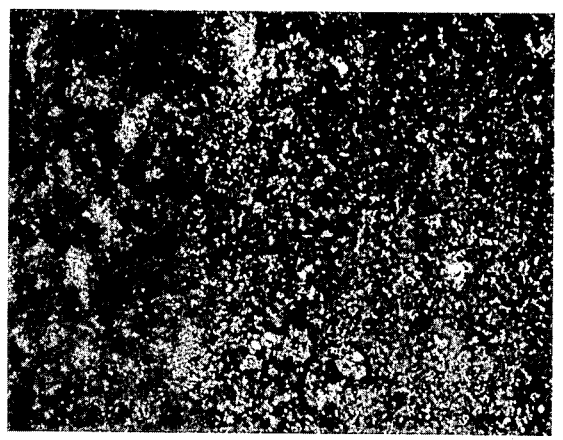
FIG. 8 is an SEM pattern of the surface of a sample (Example 15) obtained by plasma-spraying Ti-$Y_2O_3$ as an interlayer on a substrate of an alumina-type ceramic and further plasma-spraying SiC-$Y_2O_3$.

Under the plasma-spraying conditions described in Example 8, a composition composed of 5 mole % of $Y_2O_3$ and the remainder being Ti was plasma-sprayed onto a substrate of an alumina-type ceramic, and then SiC-5 mole % $Y_2O_3$ was further plasma-sprayed. (See FIG. 8.)

EXAMPLE 16

Figure 9:
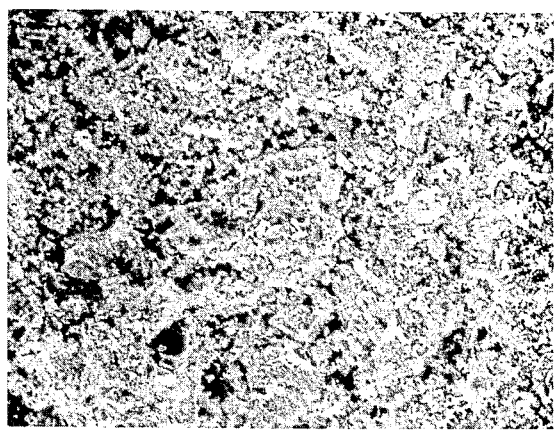
FIG. 9 is an SEM pattern of the surface of a sample (Example 16) obtained by plasma-spraying Ti-$Y_2O_3$ as an interlayer on a substrate of an SiC-type ceramic and further plasma-spraying $Si_3N_4$-$Y_2O_3$.
Figure 10A:
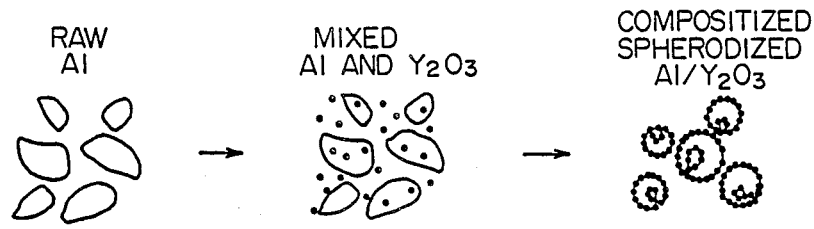
FIGS. 10a and 10b are schematic views showing methods of producing a composite powder of a metal and yttria using the mechanical impact applying technique.
Figure 10B:
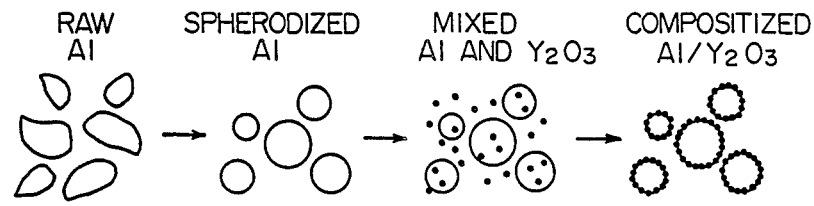

Under the plasma-spraying conditions described in Example 8, a composition composed of 5 mole % of $Y_2O_3$ and the remainder being Ti was plasma-sprayed onto a substrate of an SiC-type ceramic, and then $Si_3N_4$-10 mole % $Y_2O_3$ was further plasma-sprayed. (See FIG. 9.)

EXAMPLE 17

Production of an Al-$Y_2O_3$ composite powder by the mechanical impact applying technique

Figure 11:
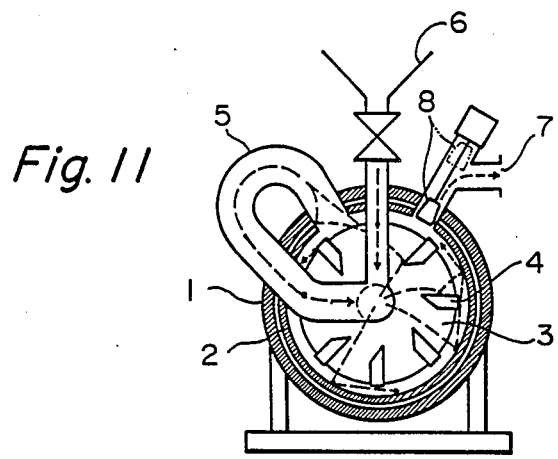
FIG. 11 is a sectional view of an apparatus for applying an impact to a powder.

The apparatus shown in FIG. 11 was used in order to give a mechnical impact to a powder.

In FIG. 11, 1 represents a stator; 2, a heating or cooling jacket; 3, a rotor rotating at a high speed in the stator; 4, impact blades fitted radially to the rotor 3; 5, a cirulaion circuit which is opened at one end in a portion of the inside wall of the stator 1 and at the other end in the vicinity of the center of the rotor 3; 6, a material hopper; and 7, a discharge port equipped with a discharge valve. The powders were fed into the apparatus through the hopper 6 and carried in the direction of the outer circumference of the rotor whie being dispersed by the action of the rotor 3 rotating at a high speed. They repeatedly underwent impact by the impact blades 4 and the inside surface of the stator 2, further passed through the circulation circuit 5, and were again fed into the apparatus. Thus, it again underwent impact repeatedly. After a predetermined period of time, the discharge valve 8 was opened, and the treated powder was recovered from the discharge port 7.

An irregularly-shaped atomized powder of Al alloy having an average diameter of 39 micrometers (96 mole %) and 4 mole % of a yttrium powder having an average diameter of 3.5 micrometers were intimately mixed. Then a mechanical impact was applied to the resulting mixture by using the apparatus shown in FIG. 11 at a rotor peripheral speed of 100 m/s for 6 minutes. A spherical composite powder having an average diameter of about 40 micrometer.

The composite powder had a fluidity, measured by JIS Z2502 "Measuring method of fluidity of Metals", of 56. The fluidity set forth in the above JIS tesing method denotes the time in seconds within which 50 g of the powder flows.

Figure 12:
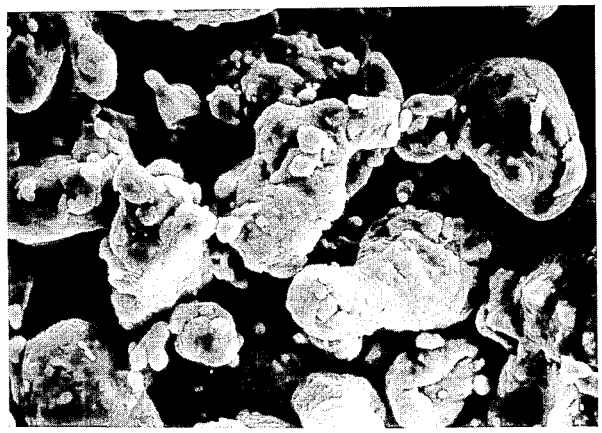
FIG. 12 shows an SEM pattern of an aluminum atomizing powder.
Figure 13A:
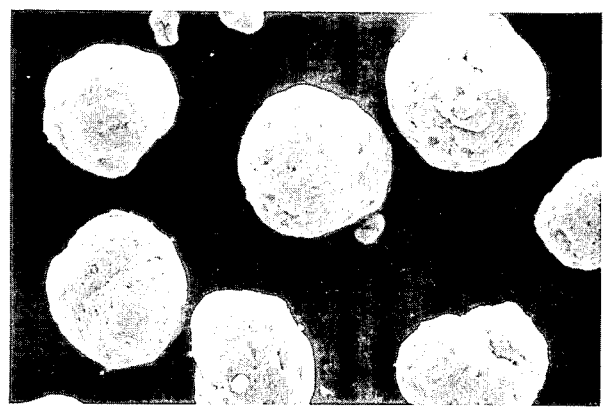
FIG. 13a is an SEM pattern of the external form of an Al-$Y_2O_3$ composite powder produced in Example 17.
Figure 13B:
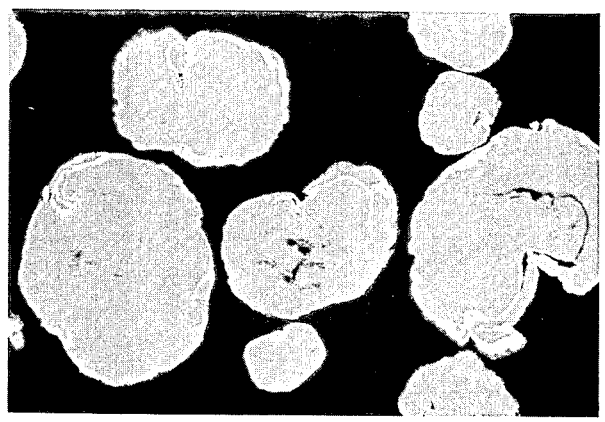
FIG. 13b is a sectional SEM (back-scattering mode) pattern of the Al-$Y_2O_3$ composite powder produced in Example 17.

A SEM (scanning electron micrography) pattern of the starting Al atomized powder is shown in FIG. 12, and an SEM pattern of the external form, and a sectional SEM (back-scattering mode pattern, of the produced Al-$Y_2O_3$ composite powder are shown in FIGS. 13a and 13b respectively. From an electron probe microanalysis (EPMA) pattern of a section of one composite particle which is not shown in any of the drawings accompanying this application, it is seen that yttria firmly adheres to the surface of the spherical Al particle, and part of yttria is taken into the interior of the Al powder, and further that a diffused layer formed in the interface between Al and yttria.

EXAMPLE 18

Production of an Al-$Y_2O_3$ composite powder by the mechanical impact applying technique An Al-yttria mixed powder was produced by the same method as in Example 17 except that 97.0 mole % of a spherical Al alloy powder having an average particle diameter of 43 micrometers and 3.0 mole % of a yttria powder having an average particle diameter of 3.5 micrometers were used as the starting materials.

The resulting Al-yttria composite powder had a fluidity of 57, and the starting spherical Al alloy powder had a fluidity of 62.

EXAMPLE 19

Production of a SUS-$Y_2O_3$ composite powder by the mechanical impact applying technique $Y_2O_3$ (0.4 mole %) having an average particle diameter of 1.0 micrometer was mixexd with 99.6 mole % of an irregularly-shaped stainless steel powder (SUS 321) having an average particle diameter of 5 micrometers. The mixed powder was treated at a speed of 80 m/sec for 3 minutes in the apparatus shown in FIG. 11. The resulting powder was observed by SEM. The results showed that a spherical SUS 321/$Y_2O_3$ composite powder was obtained.

EXAMPLE 20

Production of a SUS-$Y_2O_3$-$Al_2)_3$ composite powder by the mechanical impact applying technique A SUS-$Y_2O_3$-$Al_2O_3$ was produced in the same way as in Example 17 except that 3.55 mole % of yttria having an average particle diameter of 3.5 micrometers, 1.44 mole % of $Al_2O_3$ having an average particle diameter of 4 micrometer, and a balanced mole % of an irregularly shaped stainless steel (SUS 304) having an average particle diameter of 58 micrometers were used as the starting materials, and the treating time in the mechanical impact applying apparatus was changed to 3 minutes.

The resulting composite powder had a fluidity of 30. It was found from the SEM pattern of the composite powder that the ceramic was firmly bonded to the surface of the SUS powder, and part of the creramic was taken into the inside of the SUS powder.

EXAMPLE 21

Production of a SUS-PSZ composite powder by the mechanical impact applying method A SUS-PSZ composite powder was produced by the same method as in Example 17 except that 96 mole % of an irregularly-shaped stainless steel (SUS 304) powder having an average particle diameter of 58 micrometers and 4 mole % of partially stabilized zirconia (PSZ) granules were used as the starting materials, and the treating time in the mechnical impact applying apparatus was changed to 3 minutes.

The resulting composite powder had a fluidity of 17 showing very good flowability.

EXAMPLES 22-31

Bonding of Al to ceramic through an interlayer composed of the composite powders produced by the mechanical applying method In each run, an interlayer composed of a composite spherical powder having the composition shown in the second column of Table II and sujbected to machanical impact treatment was plasma-sprayed onto an Al alloy under the spraying conditions shown in Table III. Examples 30 and 31 are comparisons.

Figure 14A:
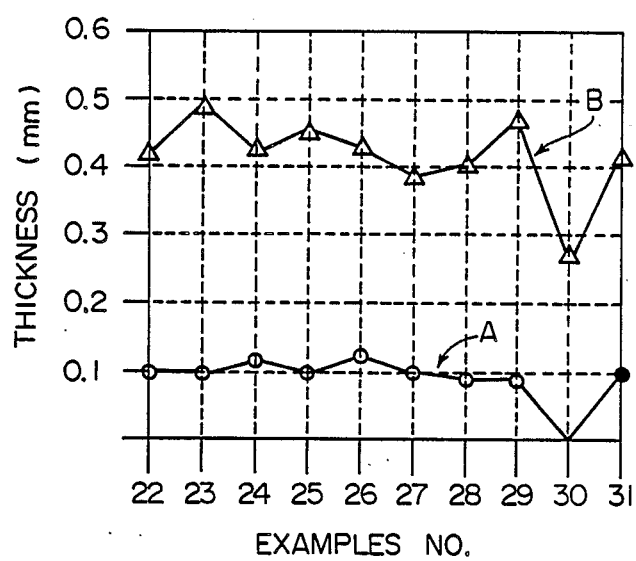
FIG. 14a is a graph showing the thicknesses of the interlayers and the ceramic layers of the Al-ceramic bonded structures produced in Examples 22 to 31.

FIG. 14a shows the thicknesses of the interlayer and the ceramic layer in each of the Al-ceramic bonded structures obtained. In FIG. 14a, curve A shows the thickness of the interlayer, while curve B, the thickness of the interlayer plus ceramic layer.

EXAMPLES 32-43

Bonding of chromium steel and ceramic through an interlayer composed of a composite powder produced by the mechanical impact applying technique In each run, an interlayer composed of a composite spherical powder having each of the compositions shown in the second column of Table IV and subjected to the mechanical impact applying treatment was plasma-sprayed on heat-resistant chromium steel, and each of the ceramics shown in the third column of Table IV was plasma sprayed onto the interlayer. The plasma-spraying conditions were as shown in Table III. In Table IV, Examples Nos. 42 and 43 are comparisons.

Figure 14B:
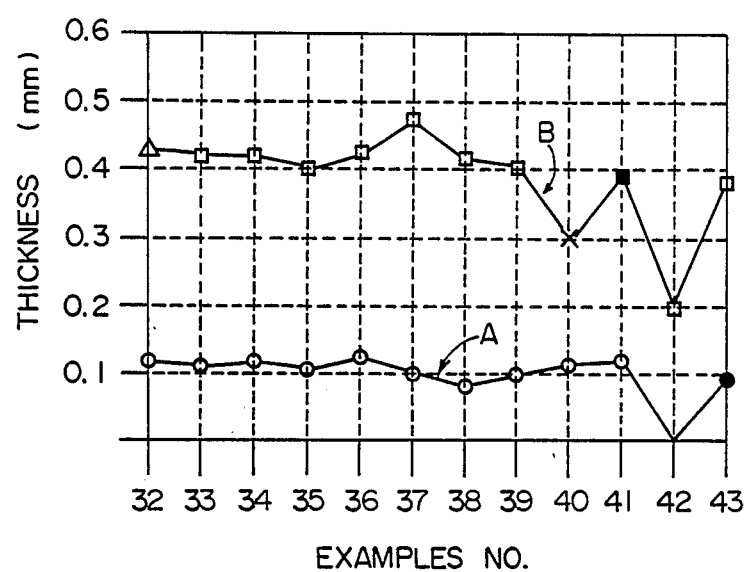
FIG. 14b is a graph showing the thicknesses of the interlayers and the ceramic layers of the chromium steel-ceramic bonded structures produced in Examples 32 to 43.

FIG. 14b shows the thicknesses of the interlayer and the ceramic layer in each of the Cr steel-ceramic bonded structures obtained. In FIG. 14b, curve A shows the thickness of the interlayer, while curve B, the thickness of the interlayer plus ceramic layer.

In each run, a test piece for tensile testing and a test piece for heat cycle testing were prepared, and tested by the following methods.

Tensile test

Two rods of a substrate metal, 100 mm long and 18 mm in diameter, were used. One end surface of one aluminum rod was finished by a #400 abrasive material and blasted. An interlayer composed of a composite powder in each run was plasma-sprayed onto the rod and then a ceramic powder was plasma-sprayed onto the ceramic. The upper surface of the sprayed ceramic layer was polished with an abrasive material having a particle size of 1 micrometer and laid parallel to the end surface of the substrate alumium rod. The end surface of the other aluminum rod was placed in abutment with the end surface of the aluminum rod having the plasma-sprayed layer. By using a jig, the rods were positioned such that the axis of the two aluminum rods were aligned in a straight line. A one-package heat-curable epoxy adhesive was coated on the abutting surfaces, and they were pressed. The resulting structure was heated at 180° to 200° C. to bond the two rods.

The resulting test piece was subjected to a tensile test at a speed of 0.5 mm/min. by using an Instron tensile tester. The results are given in the 4th column of Tables II and IV.

When a structure obtained by bonding metals of the same kind under optimal conditions was subjected to the tensile test, fracture occurred at inside of the adhesive and its tensile strength at this time was 7.7 kg/mm$^2$. When the sample was fractured at the adhesive portion and not at the metal-ceramic bonded portion in the above tensile test, its tensile strength was expressed as >7.7 kg/mm$^2$. The tensile strength of 7.7 kg/mm$^2$ is close to the tensile strength of a metal-ceramic bonded structure obtained by soild-phase bonding.

Heat cycle test

Figure 15:
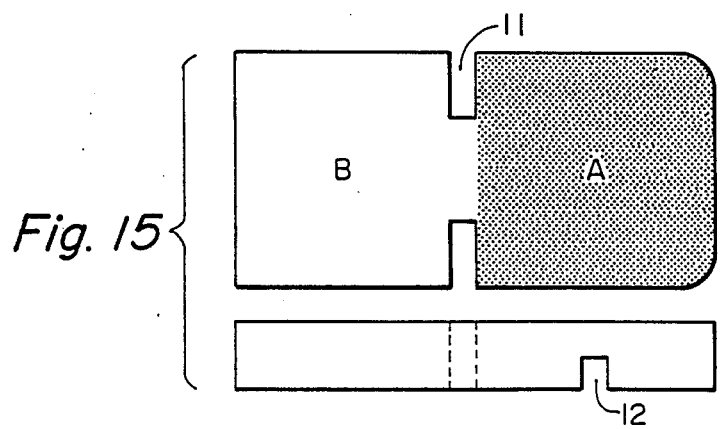
FIG. 15 shows a top plan view and a sectional view of a heat cycle test piece.

A substrate metal having a thickness of 6 mm, a length of 100 mm and a width of 50 mm was processed into the shape shown in FIG. 15 consisting of a plasma-spraying portion A, a grasping portion B, a recesses 11 for suppressing conduction of heat from the plasma-spraying portion to the grasping portion, and an opening 12 for insertion of a thermocouple. The corners of the plasma-spraying portion A were rounded to avoid abnormal heat stresses.

An interlayer composed of each composite powder was plasma-sprayed onto the surface of the portion A, and then a ceramic powder was plasma-sprayed onto the interlayer.

A rotating shaft was fixed to the grasping portion B via heat insulating material. Accordingly, the heat cycle test piece shown in FIG. 15 is rotatable around the rotating shaft. A burner for heating the plasma-spraying portion was provided in a certain part in the rotating path of the plasma-spraying portion A. A gas releasing nozzle for cooling the plasma-spraying portion was provided at a position 180° apart from the burner in the rotating path of the plasma-spraying portion A.

When the heat cycle test piece was rotated at a predetermined speed, the spraying portion A repeatedly underwent heating and cooling. With a cycle time of 30 seconds and 60 seconds, heating and cooling were repeated 2000 times. During this time, the state of peeling of the plasma-spraying portion was observed under a binocular microscope. Th heat cycle chracteristic was evaluated by the number of cycles at which peeling occurred. When no peeling occurred through 1000 cycles, the heat cyele number was expressed as 2000.

The results are shown in the fifth column of Tables II and IV.

Figure 16A:
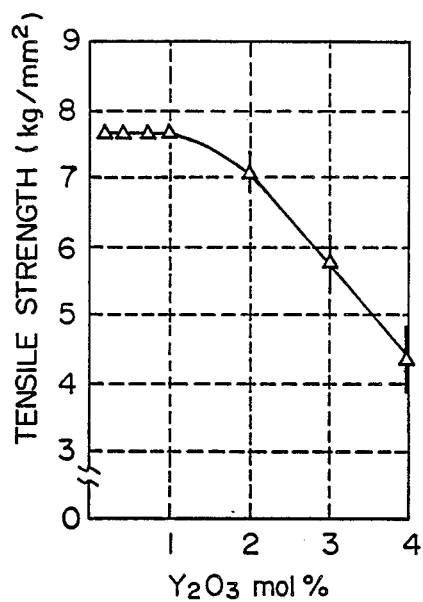
FIGS. 16a and 16b are graphs showing the relation between the tensile strength and the mount of yttria and the relation between the heat cycles and the amount of yttria in the Al-ceramic bonded structures produced in Examples 22 to 31.
Figure 16B:
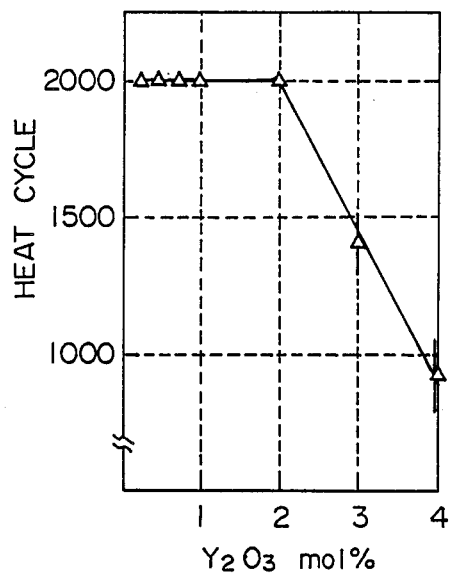
Figure 17A:
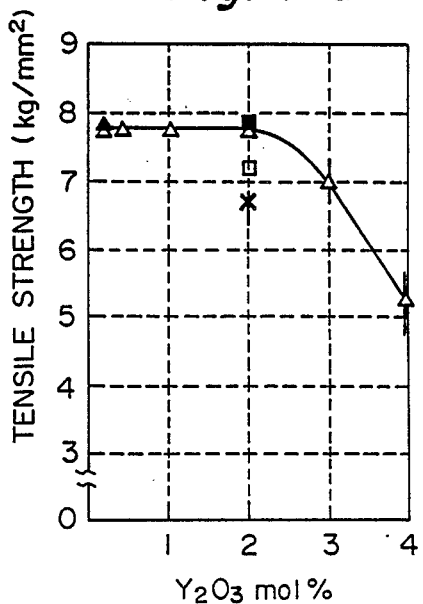
FIGS. 17a and 17b are graphs showing the relation between the tensile strength and the amount of yttria and the relation between the heat cycles and the amount of yttria in the Cr steel-ceramic bonded structures produced in Examples 32 to 43.
Figure 17B:
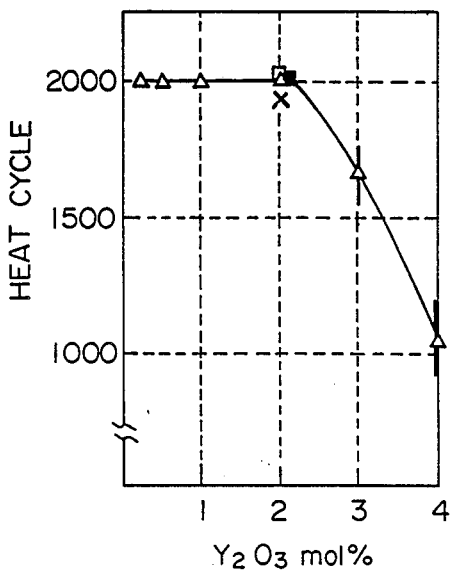

On the basis of the data given in Tables II and IV variations in tensile strength with changes in the amount of yttria are shown in FIGS. 16a and 17a and variations in heat cycle number with changes in the amount of yttria, in FIGS. 16b and 17b.

It is seen from FIGS. 16a and 16b and 17a and 17b that when the mechanical impact applying technique was used, the amount of yttria in the interlayer composition is preferably 0.2 to 4 mole %, and especially preferably 0.2 to 2 mole %.

TABLE II

| Example | Interlayer | Ceramics | Tensile strength (kg/mm$^2$) | Heat cycle 450→145° C. |
|---|---|---|---|---|
| 22 | Al 0.2 mol % Y$_2$O$_3$ | METECO 205NS | >7.7 | 2000 |
| 23 | Al 0.4 mol % Y$_2$O$_3$ | METECO 205NS | >7.7 | 2000 |
| 24 | Al 0.7 mol % Y$_2$O$_3$ | METECO 205NS | >7.7 | 2000 |
| 25 | Al 1 mol % Y$_2$O$_3$ | METECO 205NS | >7.7 | 2000 |
| 26 | Al 2 mol % Y$_2$O$_3$ | METECO 205NS | 7.0 | 2000 |
| 27 | Al 3 mol % Y$_2$O$_3$ | METECO 205NS | 5.7 | 1324 |
| 28 | Al 4 mol % Y$_2$O$_3$ | METECO 205NS | 4.3 | 850 |
| 29 | Al 2 mol % PSZ | METECO 205NS | 7.2 | 1324 |
| 30 | 0 | METECO 205NS | 1.5 | 316 |
| 31 | METECO 461NS | METECO 205NS | 3.8 | 295 |

In the table, METECO 205NS is a commercial PSZ product and METECO 461NS is a commercial powder composed of Ni, Co, Al and Y$_2$O$_3$.

TABLE III

| Plasma-spraying conditions | |
|---|---|
| Spray gun | SG-100 |
| Gas | |
| Ar | 110 SCHF |
| He | 20 SCFH |
| Spraying distance | 100 mm |
| Voltage | 45 Volt |
| Carrent | 800 A |
| One pass | 2 sec |
| Scanning of the spray gun | width 500 mm  length 200 mm |

TABLE IV

| Example | Interlayer | Ceramics | Tensile strength (kg/mm$^2$) | Heat cycle 480⇌145° C. |
|---|---|---|---|---|
| 32 | SUS304 0.2 mol % Y$_2$O$_3$ | METECO 205NS | >7.7 | 2000 |
| 33 | SUS304 0.2 mol % Y$_2$O$_3$ | METECO 105NS | >7.7 | 2000 |
| 34 | SUS304 0.4 mol % Y$_2$O$_3$ | METECO 105NS | >7.7 | 2000 |
| 35 | SUS304 1 mol % Y$_2$O$_3$ | METECO 105NS | >7.7 | 2000 |
| 36 | SUS304 2 mol % Y$_2$O$_3$ | METECO 105NS | >7.7 | 2000 |
| 37 | SUS304 | METECO 105NS | 7.0 | 1650 |

TABLE IV-continued

| Example | Interlayer | Ceramics | Tensile strength (kg/mm$^2$) | Heat cycle 480⇌145° C. |
|---|---|---|---|---|
| 38 | 3 mol % Y$_2$O$_3$ SUS304 | METECO 105NS | 5.2 | 1020 |
| 39 | 4 mol % Y$_2$O$_3$ SUS304 | METECO 105NS | 7.2 | 2000 |
| 40 | 2 mol % (Y$_2$O$_3$·Al$_2$O$_3$) SUS321 | Si$_3$N$_4$ | 6.8 | 1850 |
| 41 | 2 mol % Y$_2$O$_3$ SUS321 | TiN | >7.7 | 2000 |
| 42 | 2 mol % Y$_2$O$_3$ 0 | METECO 105NS | — | 72 |
| 43 | METECO 461NS | METECO 105NS | 5.2 | 1620 |

In the table, SUS 304 shows steel containing 18% Cr, 8% N and 0.008% C; SUS 321, steel containing 18% Cr, 8% Ni and Ti; and METECO 105 NS, a commercial alumina powder for plasma-spraying.

According to this invention described in detail hereinabove, a ceramic material and a metallic material, or two dissimilar ceramic materials, can be firmly bonded to each other by using the particular interlayers described hereinabove, and ceramic and metallic materials to be bonded and their combinations can be selected relatively freely within wide ranges. The present invention can easily give bond structures having excellent thermal stability, abrasion resistance, corrosion resistance, electrical conductivity and insulating property and sufficiently high bond strength.

What is claimed is:

1. A bonded structure of a metal and a ceramic, both bonded through an interlayer, wherein said interlayer consists of
    (a) a composition composed of 0.2 to 4 mole % of yttria and a balanced mole % of the main component of the metal to be bonded in which a powder of said metal and a powder of yttria are intimately mixed and then given a mechanical impact whereby the two powders are bonded to each other to form a nearly spherical composite powder or
    (b) a composite composed of 0.2 to 4 mole % of yttria, up to 2 mole % of the main component of the ceramic to be bonded and a balanced mole % of the main component of the metal to be bonded, in which a powder of said metal, a powder of yttria and a powder of said ceramic are intimately mixed and then given a mechanical impact, whereby these powders are bonded to one another to form a nearly spherical composite powder, said interlayer is formed by plasma-spraying the components of said composition onto the ceramic or metal to be bonded, or by coating the components of said composition on the ceramic or metal to be bonded and then heat-treating the resulting structure at a high temperature in vacuum or in an inert gas.

2. A bonded structure of a metal and a ceramic in which a layer of the ceramic is coated on the surface of the metal as a substrate through an interlayer, wherein said interlayer is formed by plasma-spraying
    (a) a composition composed of 0.2 to 4 mole % of yttria and a balanced mole % of the main component of the substrate metal, in which a powder of aid substrate metal and a powder of yttria are intimately mixed and then given a mechanical impact whereby the two powders are bonded to each other to form a nearly spherical composite powder, or
    (b) a composition composed of 0.2 to 4 mole % of yttria, up to 2 mole % of the main component of the ceramic and a balanced mole % of the main component of the substrate metal, in which a powder of said metal, a powder of yttria and a powder of said ceramic are intimately mixed and given a mechanical impact whereby these powders are bonded to one another to form a nearly spherical composite powder, on the surface of the substrate metal, or by coating each said composition on the surface of the substrate metal and then heat-treating the resulting structure at a high temperature in vacuum or in an inert gas.

3. A bonded structure of a ceramic and a metal in which a layer of the metal is coated on the surface of the ceramic as a substrate through an interlayer, wherein said interlayer is formed by plasma-spraying
    (a) a composition composed of 0.2 to 4 mole % of yttria and a balanced mole % of the main component of the metal to be coated, in which the metal powder and the yttria powder are intimately mixed and then given a mechanical impact whereby the two powders are bonded to each other to form a nearly spherical composite powder, or
    (b) a composition composed of 0.2 to 4 mole % of yttria, up to 2 mole % of the main component of the ceramic and a balanced mole % of the main component of the metal to be coated, in which the metal powder, the yttria powder and the ceramic powder are intimately mixed and then given a mechanical impact whereby these powders are bonded to one another to form a nearly spherical composite powder, on the surface of the substrate ceramic, or by coating each said composition on the surface of the substrate ceramic and then heat-treating the resulting structure at a high temperature in vacuum or in an inert gas.

* * * * *